June 15, 1954 P. C. GIRDLESTONE 2,680,862
APPARATUS FOR WRAPPERING BOOKS
Filed May 18, 1950 9 Sheets-Sheet 1

INVENTOR
Peter C. Girdlestone
By Watson, Cole, Grindle & Watson

June 15, 1954   P. C. GIRDLESTONE   2,680,862
APPARATUS FOR WRAPPERING BOOKS
Filed May 18, 1950   9 Sheets-Sheet 2

INVENTOR
Peter C. Girdlestone

By Watson, Cole, Grindle & Watson

June 15, 1954  P. C. GIRDLESTONE  2,680,862
APPARATUS FOR WRAPPERING BOOKS
Filed May 18, 1950  9 Sheets-Sheet 6

INVENTOR
Peter C. Girdlestone
By Watson, Cole, Grindle & Watson

June 15, 1954   P. C. GIRDLESTONE   2,680,862
APPARATUS FOR WRAPPERING BOOKS
Filed May 18, 1950   9 Sheets-Sheet 7

INVENTOR
Peter C. Girdlestone
By Watson, Cole, Grindle & Watson

June 15, 1954   P. C. GIRDLESTONE   2,680,862
APPARATUS FOR WRAPPERING BOOKS
Filed May 18, 1950   9 Sheets-Sheet 8

INVENTOR
Peter C. Girdlestone
By Watson, Cole, Grindle & Watson

Patented June 15, 1954

2,680,862

UNITED STATES PATENT OFFICE 2,680,862

APPARATUS FOR WRAPPERING BOOKS

Peter Crawford Girdlestone, Lansdown, Bath, England, assignor to Altus Engineering Company (Corsham) Limited, Corsham, England, a British company Application May 18, 1950, Serial No. 162,682

3 Claims. (Cl. 11—4)

The present invention relates to improvements in apparatus for and methods of wrappering books.

The term "wrapper" includes all flexible covers for books, e. g., paper, cloth and rexine covers.

It is an object of the invention to provide a new method of and apparatus for squaring the backs of wrappered books.

According to this invention a wrappered book has its back squared in a wrappering machine by being allowed to fall, back downwards, onto a flat surface a number of times.

This may be done by allowing the book to fall, back downwards onto an oscillating platform. By "oscillating platform" is meant a platform partaking of an oscillating movement and by "oscillating movement" is meant a movement along and up simultaneously, followed by a movement back and down simultaneously. The wrappered book will move along and up with the platform but will be left in the air when the platform moves back and down, and will therefore fall back downwards, onto the platform again though it will have moved along the platform.

The invention will be more clearly understood from the following description of a book wrappering machine, given by way of example, reference being made to the accompanying drawings, in which.

In order that the individual parts of the machine shown in Figures 2-11 shall be more clearly understood, the general arrangement of the wrappering machine and its operation will be first described with reference to Figure 1.

Referring to this figure, the framework of the machine supports side 12 of the chute by means of which the unwrappered books are introduced into the machine. The other side 39 of the chute is slidably arranged on an inverted V slide on one side and a flat slide on the other shown at 142 of Figure 8. Clamp 143 is provided in order that the side 39 may be clamped in the desired position. Movement of side 39 towards and away from side 12 is effected by spiral wheel 33 which engages spiral wheel 34 on shaft 35. The threaded portion on shaft 35 engages with the threaded lug 36 secured to the framework and the head 38A of shaft 35 contacts lug 38 secured to side 39.

The wrappers are conveyed around the machine by means of a pair of chains 14. Chains 14 are intermittently driven through sprocket 15 on shaft 30 and pass around sprockets 16, 17 and 18. Sprockets 18 are mounted in bearings in blocks 140 slidably mounted in guides 141. Blocks 140 may be adjusted laterally by operation of handwheel 19 secured to threaded shaft 145 from which a similar shaft is driven on the other side of the machine through sprocket and chain drive. Similarly, sprockets 17 are mounted in bearings in blocks 20 slidably arranged in guides 21. Blocks 20 are urged towards the left, as shown in Figure 1, by the action of springs 22, thus keeping the chains 14 taut.

Immediately beneath chute 12, 39 are a pair of continuously driven rubber covered rollers 27, 28 and beneath these rollers is a second chute 29. At the bottom of chute 29 is a rocking platform 30. Rubber covered roller 28 and side 40 of chute 29 are mounted on side 39 and move with it.

Reference numeral 23 designates an adhesive applying roller driven through gears from the shaft on which sprockets 17 are carried. Adhesive applying roller 23 contacts the surface of roller 24 which dips into the adhesive bath 25 which can be heated. Rollers 23, 24 and bath 25 are mounted in a housing carried on blocks 20.

Reference numeral 13 designates the feed for the wrappers while the conveyor for removing the wrappered books is shown at 31, this conveyor 31 being driven by means of crank 32, connecting rod 32A and a ratchet and pawl on the end of the conveyor shaft 32B.

The operation of the machine is as follows:

Unwrappered books are fed one at a time into chute 12, 39 by means of a conveyor of any suitable type. Each book falls down the chute 12, 39 until further progress is prevented by the stop 26 pivoted to side 12. Meanwhile, a wrapper is fed by feed 13 into the machine. At this time, the chains 14 are stationary and the wrapper is fed into jaws (not shown in Figure 1) carried by chains 14, which jaws thereupon close. The chains 14 then move in a clockwise direction as seen in Figure 1 with the wrapper between the jaws. The chains stop with the jaws just short of adhesive roller 23. On restarting, the wrapper is carried past adhesive applying roller 23 which applies a coat of adhesive to the lower side of the wrapper. The wrapper is carried by the chains until it lies under chute 12, 39 when the chains 14 again stop. The jaws are opened and the wrapper then rests on a platform immediately below chute 12, 39 with the coat of adhesive upwards. This platform is not shown in Figure 1 but will be described in detail hereafter. When the wrapper is in position on the platform, stop 26 falls causing the unwrapped book, which is back lowermost in the chute, to fall centrally on to the wrapper, thereby squaring the back of the unwrappered book. The platform is moved sharply sideways from under the wrapper and the book and wrapper fall between rollers 27, 28 which press the wrapper to the sides of the book and then through chute 29 on to rocking platform 30. The action of oscillating platform 30 is to square the back of the wrappered book and to move the book out sideways from the machine on to conveyor 31.

In order that the machine may accommodate varying widths of books, side 39 is laterally adjustable with respect to side 12 as above described and as rubber covered roller 28 and side 40 are mounted on side 39 the distance between rollers 27 and 28, and the width of chute 29 is also automatically adjusted for the width of book.

When it is desired to wrapper a book having a different length of side, it is necessary to change the point in the chain circuit at which the jaws stop and open and deposit the wrapper on to the platform. This adjustment is effected by altering the position of sprockets 18 by operation of hand-wheel 19.

The wrapper is always registered in the feeder against a fixed side. Similarly, the books are registered against the fixed end of the input chute 12. The books are kept against the fixed end by the guide 146 which is adjustable laterally by means of clamp 147 gripping the fixed shaft 148.

Figure 2:
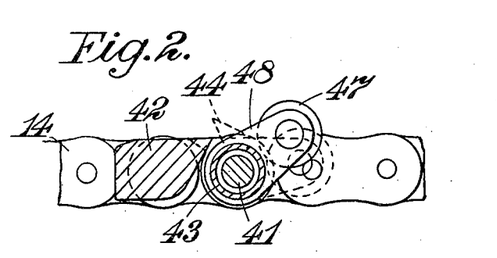
Figure 2 and Figure 3 illustrate chain carried jaws for the wrappers, Figure 2 being a section on the line II—II of Figure 3 and Figure 3 being a plan view.
Figure 3:
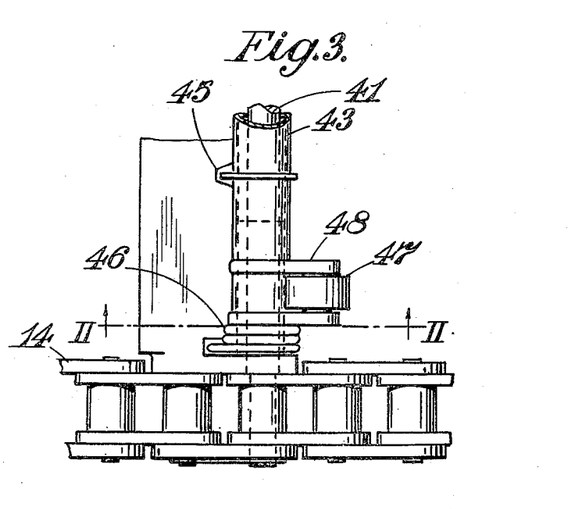

Figures 2 and 3 show the jaws mounted on the chains 14. Two rods 41, 42 are carried between the two chains 14. Rod 41 carries sleeve 43 which has at regular intervals along its length a number of nibs 44 which can contact the flat face 45 of rod 42. Springs 46 carried on sleeve 43 urge sleeve 43 into the position in which nib 44 contacts flat 45 (the closed position of the jaws). Sleeve 43 has secured to it lever 48 on which is mounted a roller 47. Pressure applied to the roller 47 in the direction towards the chains 14 rotates sleeve 43 and forces the jaws into the open position, shown dotted in Figure 2.

Figure 1:
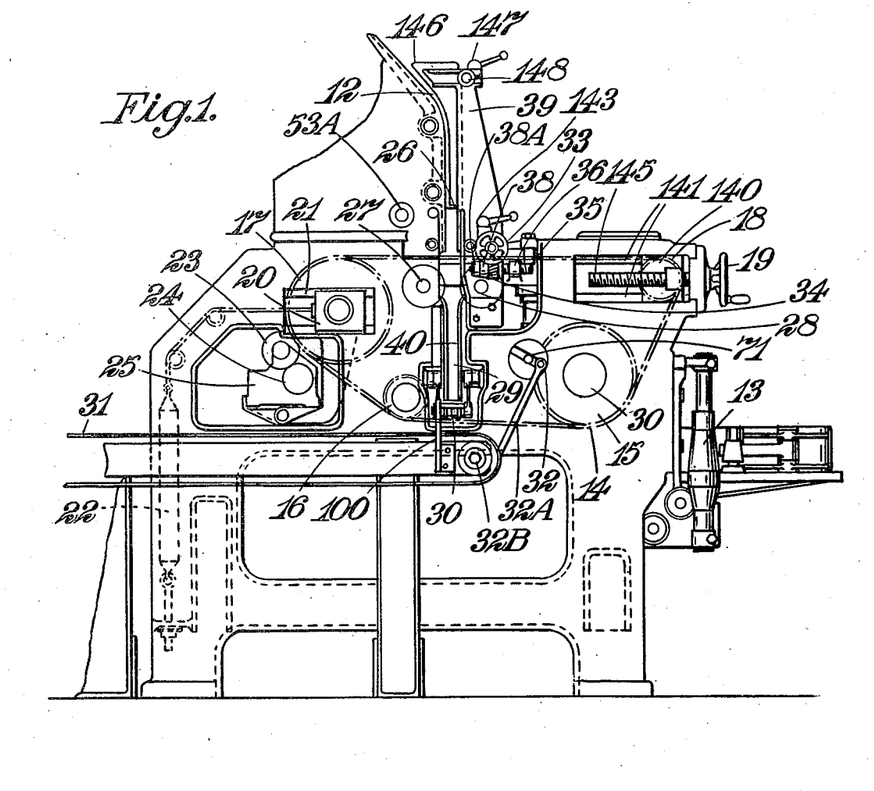
Figure 1 is a side view of the whole machine.
Figure 4:
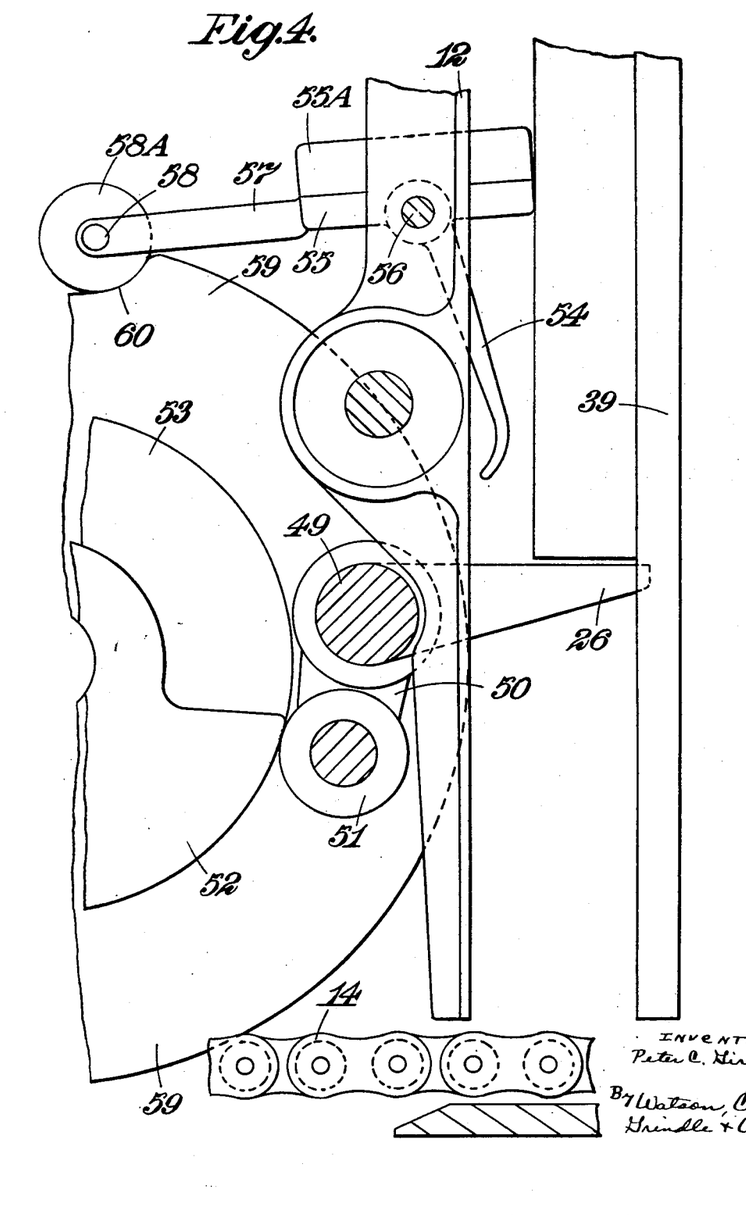
Figure 4 is a side view of the chute for the unwrappered books.

Figure 4 illustrates in further detail the chute 12, 39 of Figure 1. The stop 26 is carried on shaft 49 which also carries lever 50 which in turn carries roller 51. Roller 51 engages the surface of cam 52. Normally the contact between roller 51 and cam 52 maintains the stop 26 across the chute 12, 39 as shown. However, stop 26 is permitted to drop when the cut away portion 53 of cam 52 is opposite the roller 51. Cam 52 rotates continuously.

Above the stop 26 is a finger 54 which is secured to member 55 pivoted to the side 12 of the chute at 56. Projection 57 of member 55 carries pin 58 with roller 58A which runs on cam 59. As shown, cam 59 has a cut-away portion 60 into which roller 58A can drop on rotation of cam 59. Normally, finger 54 is held out of chute 12, 39 but, as roller 58A falls into portion 60 of cam 59, finger 54 is urged momentarily into the chute. This occurs immediately prior to the falling of stop 26 and if there is a book in the chute on the stop 26, movement of finger 54 into the chute 12 is prevented. However, if through some fault of the supply, no book is in the chute, finger 54 enters the chute and this movement operates a mercury switch 55A which stops the motor of the machine, thus preventing more wrappers being supplied to the machine.

Figure 5:
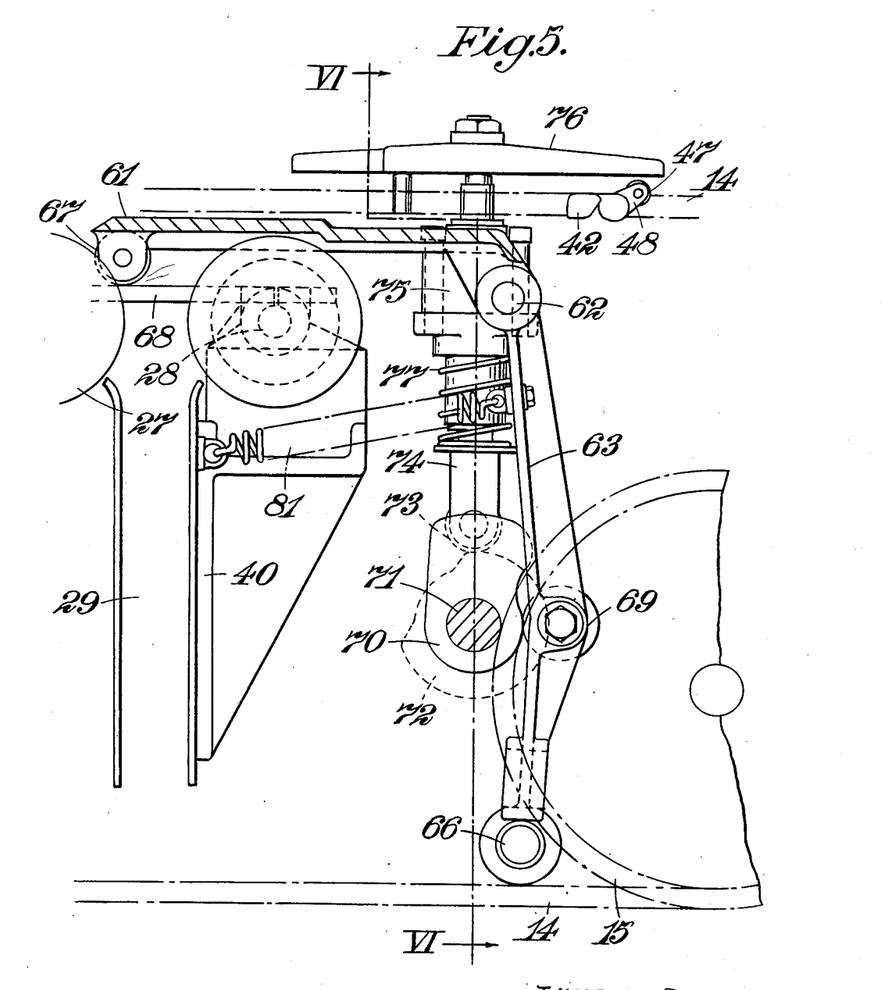
Figures 5 and 6 illustrate the laterally movable platform, Figure 5 being a view in the direction of arrow V of Figure 6 and Figure 6 being a section on the lines VI—VI of Figure 5.
Figure 6:
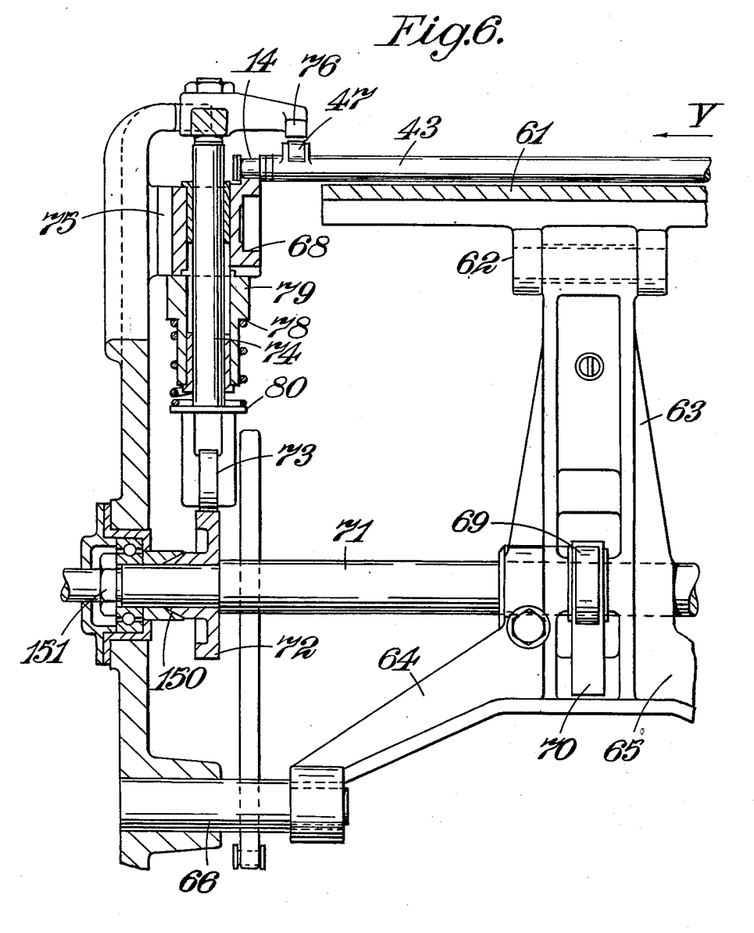

The platform beneath chute 12 is shown at 61 in Figures 5 and 6. One end of platform 61 is pivoted at fulcrum 62 to lever 63 which, at its lower end, has two arms 64, 65 pivoted by means of fulcrum 66 to the framework. The other end of platform 61 carries rollers 67 which roll in slots 68 in the main frame. Lever 63 carries roller 69 which contacts continuously driven cam 70. On rotation of cam 70, roller 69 is forced sharply laterally against the action of spring 81 causing lever 63 to pivot about fulcrums 66 resulting in the movement of platform to the right from the position shown in Figure 5. In effect, the platform 61 is drawn away from under the wrapper and book previously lying thereon. Cam 70 is carried on shaft 71; this shaft 71 also carries a second cam 72 which contacts roller 73 carried at the lower end of shaft 74. Shaft 74 runs in sleeve 79 which is firmly attached to the main frame at 75 to give a longer bearing to shaft 74. Shaft 74 carries at its upper end bar 76 lying above the chain 14 carrying roller 47. Shaft 74 is urged downwardly by compression spring 77 located between shoulder 78 of sleeve 79 and collar 80 attached to shaft 74. On rotation of cam 72, roller 73 and shaft 74 are alternately held up and allowed to drop under the action of spring 77. When shaft 74 falls, the level of bar 76 is lowered so that it forces roller 47 downwards, opens the jaws and releases the wrapper being carried over platform 61 between chains 14. Cam 72 is so arranged that the wrapper is released after cam 52 has released stop 26 (Figure 4) so that a book falls on the wrapper. The withdrawal of platform 61 from under chute 12, 39 is then caused by cam 70 so that the book and wrapper is allowed to drop between the rolls 27 and 28 (Figure 1). Relative adjustment of cams 70, 72 is enabled by the provision of conical clutch 150 which is locked by nut 151.

Reverting to Figure 1, it will be seen that operation of hand-wheel 19 alters the position of sprockets 18 with respect to sprocket 15, and hence the position of the jaws with respect to chute 12, 39 when they are opened by operation of bar 76. This adjustment is provided in order that wrappers of various lengths can be deposited (as a result of the opening of the jaws by the bar 76) on platform 61 centrally under chute 12, 39.

Figure 7:
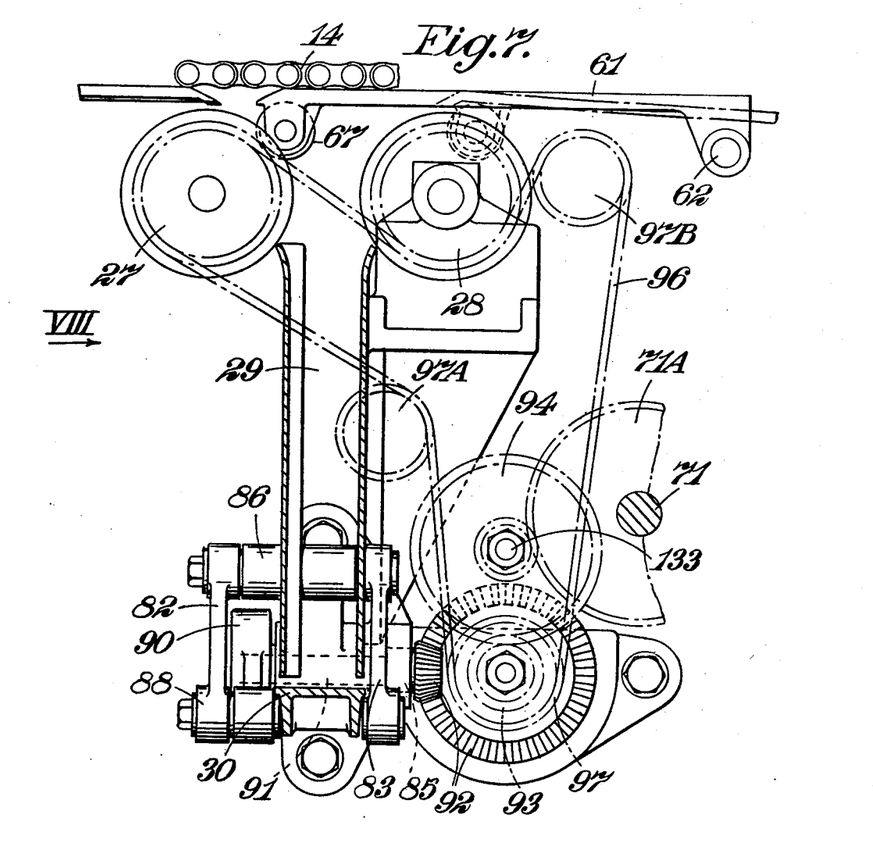
Figures 7 and 8 illustrate the oscillating platform that squares the book backs, Figure 7 being a section on the line VII—VII of Figure 8, and Figure 8 being a view taken in the direction of arrow VIII of Figure 7.
Figures 8, 9:
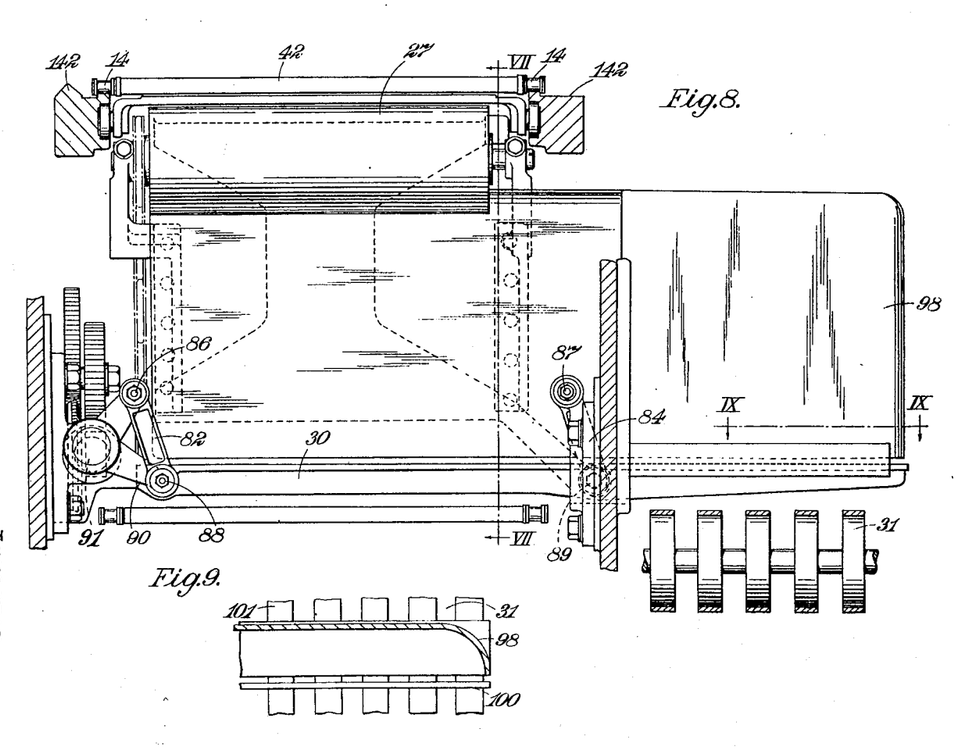
Figure 9 is a section on the line IX—IX of Figure 8.

Figures 7 and 8 illustrate in more detail the rocking platform 30 at the bottom of chute 29. This platform 30 is carried by four links 82, 83, 84, 85 oscillating at their top ends about two fixed fulcrums 86, 87, and pivoted to platform 30 on pivots 88, 89. Attached pivotally to the end of platform 30 is a further link 90 connected to a crank or eccentric 91. Crank or eccentric 91 is driven by bevels 92 and gear train 93, 94 from driving shaft 133. Pressure rollers 27, 28 are driven by chain 96 which in turn is driven by sprocket 97. The chain 96 also passes round 97A which is a tensioning sprocket and 97B which is an idler sprocket.

The position of links 82, 83, 84, 85, the throw of eccentric 91 and the speed of rotation of the eccentric 91 are so adjusted that the oscillating platform 30 moves forward and up, thereby throwing the wrappered book forward and up. While the book is still in the air, oscillating platform 30 moves back and down to its original position and the wrappered book is thus moved forward and falls again onto platform 30 thereby squaring up the back of the book. The back is kept upright, so that it falls back downward, by the parallel spaced walls of the chute 29. The wrappered book is passed out by the action of platform 30 through the side of the machine and is deflected by guide 98 at the end of one wall of the chute which tips the wrapped book over the stripper 100 on to the conveyor 31 (see Figure 9). The stripper 100 prevents the back of the book being bounced at an angle during the latter part of its movement along platform 30 and guides the book clear from platform 30 in preparation for the following book. Conveyor 31 moves, per book, a distance greater than the width of a book and less than the length of book, e. g. at about one to one and half inches per book; the books are thus stacked in echelon, that is to say in a saw tooth arrangement in which the spine of each book has its successor resting upon it.

Conveyor 31 is made up of a series of one inch wide belts 101 with one inch gaps between them. This construction enables the operator to pass his fingers between the belts and to withdraw a pile of the wrappered books which, because they overlap one another as described above, can easily be slid together.

Figure 10:
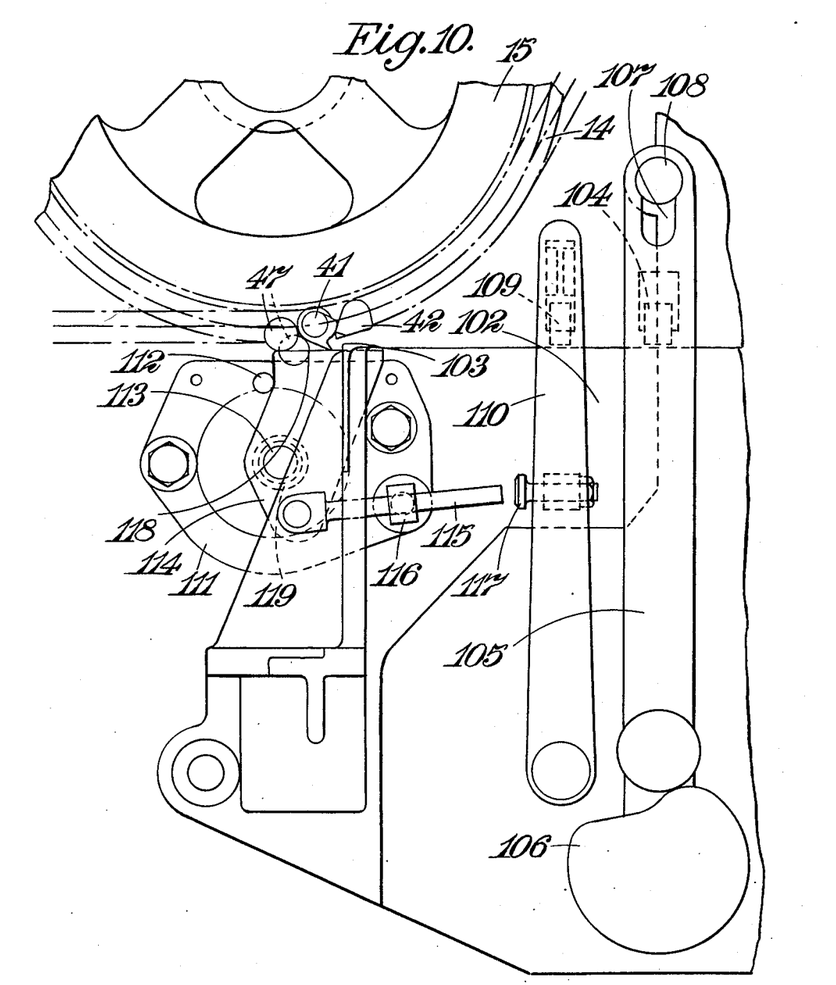
Figure 10 shows the wrapper feed.

Figure 10 illustrates the feed for the wrappers. This feed is of known form and, per se, forms no part of the present invention. The pile of wrappers is shown at 102, the front edges of the pile lying under the fingers 103. Rubber covered bar 104 is carried on bars 105 in the lower ends of which are mounted rollers running on continuously rotating cams 106. The upper ends of bars 105 have slots 107 in which engage pins 108. Thus, bars 105 and rubber covered bar 104 move upwards and downwards and alternately engage and disengage the top member of the pile 102. The second rubber covered bar 109 is supported on bars 110. Bars 110 are mounted and driven so that they first come downwardly until the rubber covered bar 109 engages the top member of the pile 102, move laterally away from fingers 103 and then move forward towards the fingers and upwards disengaging with the top member of the pile. Lastly, bars 110 return to their original position. The operation of this known form of feed is as follows; firstly, bar 104 descends and contacts the wrapper; secondly, bar 109 descends, contacts the top wrapper and moves it away from fingers 103. Bar 104 lifts and bar 109 moves forward sliding the top wrapper over the top of the fingers into the jaws between 41 and 42, which close, and, on ascent of the bar 109 the wrapper is removed by the movement of chain 14.

Plate 111 has mounted on it a fulcrum 113 and a stop 112. On fulcrum 113 is rotatably mounted cam 114. Pivoted to cam 114 is the rod 115 which passes through collar 116 on plate 111. As bars 110 move towards fingers 103, the pusher 117 secured thereto contacts rod 115 and urges it forward. Cam 114 has a flat surface 118 with which the roller 47 engages. Movement of rod 115 withdraws the cam from contact with roller 47 and enables roller 47 to spring back into its normal closed position which is shown in dotted lines in Figure 10.

The operation of this part of the machine is as follows:

The chains 14 stop with jaws 41, 42 in the position shown, i. e., just past fingers 103. The roller 47 engages surface 118 of cam 114 thus opening the jaws into which the leading edge of the wrapper is forced by the action of bars 104, 109 described above. Movement of bars 110 operates rod 115, moving cam 114 and thereby enabling the jaws to close with the wrapper therebetween. The chains 14 then start to move and take away the wrapper towards the adhesive applying roller 23. Cam 114 is urged in an anticlockwise direction as viewed in Figure 10 by spring 119 and so returns to its original position on backward movement of bars 110 resting against stop 112 after the chains 14 have moved on.

Figure 11:
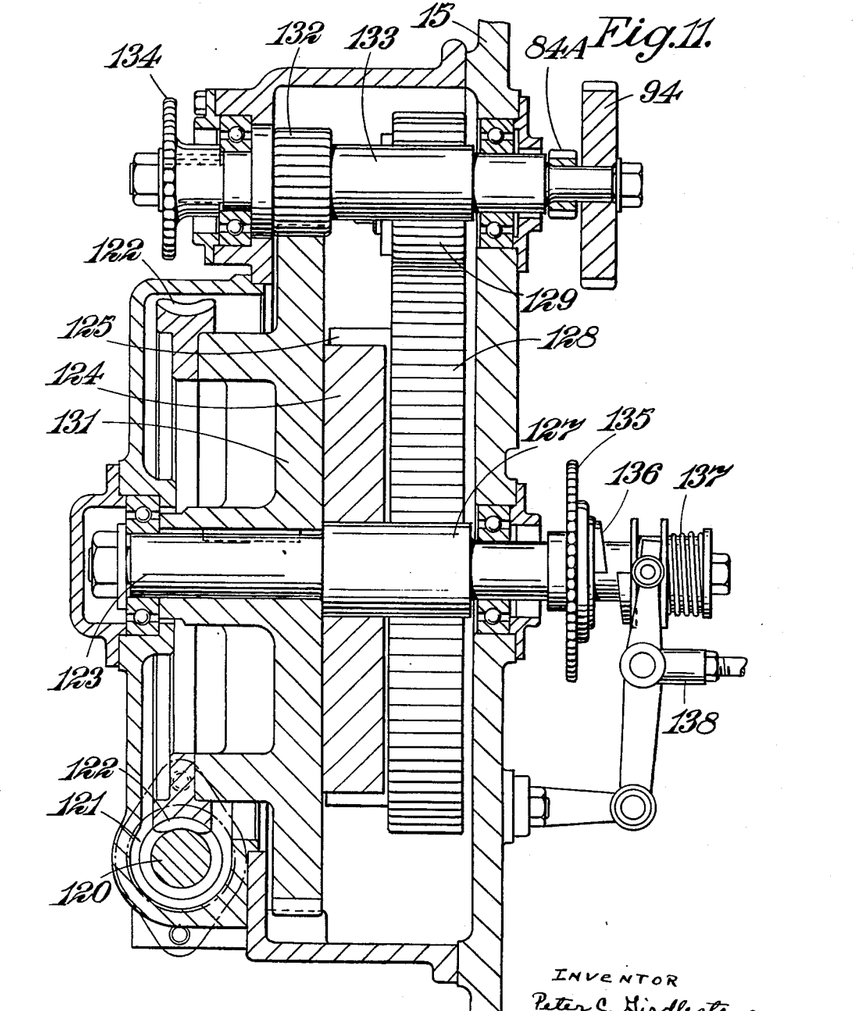
Figure 11 is a section through the gear box for the machine.

Figure 11 illustrates the gear box of the machine. Shaft 120 is driven from an electric motor (not shown) through cone pulleys (not shown) to provide variable speed. Shaft 120 carries worm 121 driving a worm wheel 122 on shaft 123. Keyed to worm-wheel shaft 123 is the drive 124 of a conventional Geneva motion mechanism. Of this mechanism, only drive 124 and driven wheel 125 is shown. This wheel 125 is mounted on a shaft (not shown) and carries spur wheel 128. Spur wheel 128 drives spur 129 keyed to shaft 130 (see Figure 1). Also keyed to shaft 130 are the sprockets 15 which drive the chains 14 (see Figure 1). Thus, the chains 14 are discontinuously driven by virtue of the Geneva motion.

Continuously driven shaft 123 also carries keyed to it spur wheel 131 driving spur 132 keyed to shaft 133. Keyed to shaft 133 is gear wheel 94 which drives rocking platform 30 as above described. Also keyed to shaft 133 is sprocket 134 which drives, through a chain and sprocket wheel, shaft 53A carrying cams 52 and 59 (Figure 4). Also keyed to shaft 133 is spur 84A which drives spur wheel 71A mounted on shaft 71 (Figures 5, 6 and 7).

Mounted freely on continuously rotating shaft 123 is chain sprocket 135. This sprocket 135 may be driven by shaft 123 through a dog clutch 136 which is urged into engagement by spring 137 but may be held out of engagement by rod 138. It will be seen that the dog clutch 136 is single toothed; this ensures that when the clutch is engaged, the feed of the wrappers will be synchronous with the movement of the jaws.

I claim:

1. Book wrappering machine, comprising a pair of spaced parallel walls to provide a chute through which wrappered books are delivered back downwards, an oscillatable platform having a horizontal upper surface located below said chute to receive books delivered therefrom, guide means for said platform to guide it during oscillation so that each part of said platform describes the arc of a circle and the upper surface is kept horizontal, and means to oscillate said platform, whereby in operation, books are received from said chute on said platform and have their backs squared by being thrown up and along to land again on their backs each time said platform oscillates the books being kept perpendicular to said platform by the walls of the chute.

2. Book wrappering machine, comprising a pair of spaced parallel walls to provide a chute through which wrappered books are delivered back downwards, a platform located below said chute to receive books delivered therefrom, swing links on which said platform is mounted, so that said platform can be oscillated in parallel motion, each part of said platform describing an arc of a circle, and means to oscillate said platform.

3. Book wrappering machine according to claim 2, wherein said means comprises an eccentric, a connecting rod between said eccentric and said platform and means to rotate said eccentric.

References Cited in the file of this patent

UNITED STATES PATENTS

| Number | Name | Date |
|---|---|---|
| 936,480 | Sague | Oct. 12, 1909 |
| 1,116,946 | Spiess | Nov. 10, 1914 |
| 1,205,023 | Roberts | Nov. 14, 1916 |
| 1,252,879 | Bredenberg | Jan. 8, 1918 |
| 1,615,194 | Swab | Jan. 18, 1927 |
| 2,163,812 | Schramm | June 27, 1939 |
| 2,599,666 | Surridge | June 10, 1952 |